(12) United States Patent
Manke et al.

(10) Patent No.: US 12,502,342 B2
(45) Date of Patent: Dec. 23, 2025

(54) COSMETIC COMPOSITION

(71) Applicants: Nicole Manke, New York, NY (US); Alessandra Sozzi, New York, NY (US)

(72) Inventors: Nicole Manke, New York, NY (US); Alessandra Sozzi, New York, NY (US)

(*) Notice: Subject to any disclaimer, the term of this patent is extended or adjusted under 35 U.S.C. 154(b) by 441 days.

(21) Appl. No.: 18/105,732

(22) Filed: Feb. 3, 2023

(65) Prior Publication Data

US 2023/0285257 A1    Sep. 14, 2023

Related U.S. Application Data

(63) Continuation-in-part of application No. 16/159,175, filed on Oct. 12, 2018, now abandoned.

(51) Int. Cl.
| | | |
|---|---|---|
| *A61K 36/00* | (2006.01) | |
| *A61K 8/49* | (2006.01) | |
| *A61K 8/55* | (2006.01) | |
| *A61K 8/73* | (2006.01) | |
| *A61K 8/9789* | (2017.01) | |
| *A61Q 19/08* | (2006.01) | |

(52) U.S. Cl.
CPC ........... *A61K 8/492* (2013.01); *A61K 8/49* (2013.01); *A61K 8/553* (2013.01); *A61K 8/735* (2013.01); *A61K 8/9789* (2017.08); *A61Q 19/08* (2013.01)

(58) Field of Classification Search
CPC ........................................... A61K 8/553
See application file for complete search history.

*Primary Examiner* — Qiuwen Mi
(74) *Attorney, Agent, or Firm* — Sofer & Haroun, LLP

(57) ABSTRACT

A method is provided for diminishing wrinkles, fine lines, blemishes, skin discoloration, cellulite, and/or bruising in human skin including administering a topical treatment on a patient's skin. The topical treatment includes Hyaluronic Acid; a suspension mixture; Tetrahydropiperine, Horse Chestnut Extract, Lecithin; and an effective dose of at least 0.5% of a compound indole-3-carbinol or its derivatives. The topical treatment is applied to the patient's skin in need of diminishment in wrinkles, fine lines, blemishes, skin discoloration, cellulite, and/or bruising.

21 Claims, No Drawings

COSMETIC COMPOSITION

RELATED APPLICATION

This application is a continuation-in-part of U.S. patent application Ser. No. 16/159,175, filed on Oct. 12, 2018, the entirety of which is incorporated by reference.

FIELD OF INVENTION

The present arrangement relates to cosmetic or similar dermatological or pharmaceutical preparations intended for improving the appearance of the skin.

DESCRIPTION OF RELATED ART

Having a nice, attractive, or otherwise positively-held appearance is highly favored. In particular, the appearance of skin has solidified itself as an important factor in one's overall appearance.

The human skin, being the largest organ, is subject to many environmental and physical factors that can have an effect on its appearance. These effects can cause the appearance of unevenness, surface tension, blemishes, unfavorable texture and conditioning, and puffiness.

While many products have been created in attempts to improve these appearances, there is a continual search for different, more effective solutions.

OBJECTS AND SUMMARY

A method is provided for diminishing wrinkles, fine lines, blemishes, skin discoloration, cellulite, bruising and superficial spider veins in human skin including administering a topical treatment on a patient's skin. The topical treatment includes Hyaluronic Acid; a suspension mixture; Tetrahydropiperine, Horse Chestnut Extract, Lecithin; and an effective dose of at least 0.5% of a compound indole-3-carbinol. The topical treatment is applied to the patient's skin in need of diminishment in wrinkles, fine lines, blemishes, skin discoloration, cellulite, bruising and superficial spider veins.

DESCRIPTION OF INVENTION

The present arrangement is directed to a topical or otherwise transdermal cosmetics or similar dermatological or pharmaceutical preparations composition containing an effective amount of indole-3-carbinol and/or its derivatives as an active ingredient, in a physiologically acceptable medium, for the purpose of improving the appearance of the skin and diminishing wrinkles, fine lines, blemishes, skin discoloration, unfavorable skin texture, cellulite, bruising and superficial spider veins.

The composition can contain at least one form of indole-3-carbinol and/or at least one form of its derivatives obtained from any material originating from a Brassica family plant cultivated in vivo or originating from in vitro culture.

Applicants note that indole-3-carbinol is a compound derived from the enzymatic hydrolysis (breakdown) of glucosinolates in plants belonging to the Brassica genus, commonly known as cruciferous vegetables.

The Brassica genus belongs to the Brassicaceae family, and as such the Brassicales order. The genus contains 20 species: *Brassica alboglabra, Brassica carinata, Brassica chinensis, Brassica cretica, Brassica elongata, Brassica fruticulosa, Brassica juncea, Brassica napus, Brassica narinosa, Brassica nigra, Brassica oleracea, Brassica parachinensis, Brassica perviridis, Brassica rapa, Brassica rupestris, Brassica ruvo, Brassica septiceps, Brassica sisymbrioides,* and *Brassica tournefortii*.

Preferentially, in the present arrangement, the material of indole-3-carbinol and/or its derivatives originates from one or more of these species.

Derivatives of indole-3-carbinol are understood to be acid condensation products, that are derived through chemical processes, frequently those in stomach acid. The acid condensation products worth mentioning in relation to the invention are 3,3'-diindolylmethane (DIM), 5,11-dihydroindolo-[3,2-b]carbazole (ICZ), and 5,6,11,12,17,18-hexahydrocyclonona[1,2-b:4,5-b': 7,8-b"]triindole. Preferentially, the composition contains the indole-3-carbinol acid condensation product 3,3'-diindolylmethane (DIM).

In one arrangement, the present invention contemplates either one of in vivo or in vitro cultivated 3,3'-diindolylmethane (DIM).

In vivo cultivation is understood as meaning any cultivation in soil in the open air or in a greenhouse, or alternatively outside the soil. In vitro culture is understood as meaning all of the techniques known to the person skilled in the art which artificially allow the obtainment of a plant or of a part of a plant.

Regarding the effective amount of 3,3'-diindolylmethane (DIM) contained in the present composition, in a preferred embodiment it can contain between 0.001% and 10% material of indole-3-carbinol and/or its derivatives. In a more preferred embodiment, the composition contains between 0.05% and 1% of the indole-3-carbinol, such as in the form of its acid condensation product 3,3'-diindolylmethane (DIM). Although, Applicants note the expected minimum effective dose is about 0.001%-0.05% it is possible with certain additional components and particular holding mediums, such minimum percentage may be slightly adjusted. Such an amount of indole-3-carbinol may boost collagen production up to 400% (helps wrinkles) and/or speed healing by up to 400% (helps blemishes).

Regarding the medium, in one embodiment the effective amount of indole-3-carbinol/3,3'-diindolylmethane (DIM) may be included in any type of stable medium including but not limited to oil based, water based or alcohol-based mediums.

In a preferred embodiment the effective amount of indole-3-carbinol/3,3'-diindolylmethane (DIM) is suspended in coconut oil.

Although no specific formulation is required apart from including an effective amount of indole-3-carbinol/3,3'-diindolylmethane (DIM), at least one specific embodiment of the present composition is formulated as followed and was applied to a test subject for efficacy testing.

In one example, a composition was prepared with a 3.24% DIM concentration in base medium formula of 58% distilled water, 12.97% petrolatum, 8.56% sea kelp extract, 7.13% cetyl alcohol, sodium polyacrylate, polsorbate 80, glyceryl stearate, dimethicone/divinyldimethicone/silsesquioxane crosspolymer mixture, 6.5% organic cold pressed pure hazelnut oil, 3.24% organic extra virgin coconut oil, and <1% parfum. In this example phenoxyenthanol as a preservative, and colorant was used. This exemplary formula was applied to one test subject twice daily (morning and late afternoon/evening) on and on-going basis for two weeks. This exemplary formula including an effective amount of DIM produced results as soon as 5 minutes after the first application with results continuing to improve upon subsequent applications. The results included but are not limited to: lessened appearance of wrinkles, fine lines, skin discoloration, unfavorable skin texture, blemishes, cellulite, bruising, and superficial spider veins. Other examples are contemplated that include similar concentrations of the effective amount of indole-3-carbinol/3,3'-diindolylmethane (DIM) within a similar medium.

In other embodiments, the composition can, but is not limited to, be additionally formulated with any one or more of the following additive ingredients, in any of their forms, in order to provide a wider range of cosmetic purposes: water, Vitamin E, Vitamin D, Vitamin K, Vitamin B1, Vitamin B2, Vitamin B3, Vitamin B4, Vitamin B5, Vitamin B6, Vitamin B9, Vitamin B12, Vitamin H, calcium, potassium, phosphorus, magnesium, iron, copper, zinc, algae, collagen, beta-carotene, alanine, arginine, asparagine, aspartic acid, cysteine, glutamine, glutamic acid, glycine, histidine, isoleucine, leucine, lysine, methionine, phenylalanine, piperine, proline, serine, threonine, tryptophan, tyrosine, valine, selenocysteine, pyrrolysine, glutathione, gamma-aminobutyric acid, kaolin, caprylic/capric triglyceride, petrolatum, sunflower wax, sodium polyacrylate, glycerin, isohexadecane, cholesterol, hazelnut oil, coconut oil, shea butter, almond butter, almond oil, avocado butter, avocado oil, argan oil, acrylates C10-30 alkyl acrylate crosspolymer, sorbitan laurate, polyglyceryl-4 laurate, dilauryl citrate, cetyl alcohol, sodium polyacrylate, polsorbate 80, glyceryl stearate, dimethicone/divinyldimethicone/silsesquioxane crosspolymer, stearic acid, ceteareth-20, cetearyl alcohol, and others.

In addition to the inclusion of the effective amount of indole-3-carbinol, other compounds may be included in the treatment method that, in their own right, may provide medicinal benefits for improving the appearance of the skin, when combined with indole-3-carbinol provide a synergistic effect so that the overall effect of the combined treatments provide an even greater effect that would be expected by the ingredients on their own.

For example, in addition to indole-3-carbinol, the following ingredients may also be included in the combined treatment:

Sea Kelp Bioferment or Extract, included at up to 90% by weight, more preferably between 3%-3.5% by weight (such weights being for the Sea Kelp which is about 98.9% Sea Kelp Bioferment or Extract, 1.1% water glycerin emulsion), that may be included for example to enhance skin appearance by removing dead skin, toxins and skin aging inflammation;

Vitamin C, included at up to 10% by weight, more preferably 0.25% and 0.75% by weight, that may be included for example as a strong anti-oxidant and skin brightener;

Hyaluronic Acid, included at up to 10% by weight, more preferably between 0.35% and 2% by weight, that may be included for example for improved skin hydration/hydration retention for better skin health and/or reducing the appearance of wrinkles;

Tetrahydropiperine, included at 0001% and 2.5% by weight, more preferably between 0.8% and 1.5% by weight, that may be included for example to speed and improve skin permeability for all nutrients, including those included in this treatment;

Horse Chestnut Extract (Aesculus Hippocastanum, also know as Aescin, Aescine, or Esin), included at up to 90% by weight, more preferably between 1.5% and 7.5% by weight (such weights being for the horse chestnut extract which is about 99% horse chestnut extract, 1% leucidal liquid or 98% horse chestnut extract and 2% sunflower oil), that may be included to improve circulation and reduce inflammation and/or redness for skin blemishes as well as to provide antioxidant activity to diminish signs of aging;

Lecithin (sunflower or soy), included at up to 25% by weight, more preferably between 0.1% and 10% by weight, that may be included to improve skin smoothness and for preventing transdermal hydration loss; and Squalane, included at up to 100% (minus the percentage of other ingredients including indole-3-carbinol or its derivatives) and more preferably at 1.6% to 3% by weight, that may be included as a bio-identical emollient to improve absorption and also for its anti-oxidant properties that are anti-inflammatory (for blemishes) and anti-aging (for wrinkles).

To this point, as noted above, each of the additional ingredients for the treatment listed above; Sea Kelp Bioferment or extract, Vitamin C, Hyaluronic Acid, Tetrahydropiperine, Horse Chestnut Extract, Squalane, and Lecithin (sunflower or soy), have some known independent effects. However, the applicant has found that when used in combination with the presently effective amount of indole-3-carbino or its derivatives there is a synergistic effect when used together to provide improved skin effects including reduced blemishes and wrinkles, beyond that achieved by any of the ingredients for the method taken alone.

For example, although indole-3-carbinol (DIM) or its derivatives boosts collagen production and speeds healing it is not necessarily absorbable topically without other substances. Some prior art clinical tests are done by suspending it in DMSO, which is not safe for cosmetic use. The speed of absorption and bioavailability are critical for indole-3-carbinol DIM or its derivatives to function since it otherwise just sits on the skin and is not favorably absorbed for cosmetic effects.

The present applicants have found that above effective amounts of Tetrahydropiperine (AKA cosmoperine) as well as Squalane accelerate the bioabsorption of the effective amount of indole-3-carbinol (DIM) or its derivatives into the skin. Additionally, the present applicants found that by combining this with the effective amounts of lecithin it stabilizes the suspension/emulsion and permits the indole-3-carbinol (DIM) or its derivatives to remain stable and present, i.e. absorbable for cosmetic effects. Thus the Lecithin, combined with Tetrahydropiperine in this case can help ensure that the indole-3-carbinol or its derivatives are delivered and retained in the correct places to impact the affected skin cells. By further combining the above treatments with the amount of Horse Chestnut Extract described above it can increase blood flow on the affected area to even further improve the speed and permeability of the treatment into the skin. This is even further enhanced by the inclusion of hyaluronic acid in the amount described above that rapidly increases and maintains skin hydration, improving permeability and absorption.

Together the combination of treatments in the present method improves on skin blemishes and wrinkle mitigation in an amount greater than any one of the ingredients alone.

In one exemplary arrangement a first treatment method includes treating skin blemishes and wrinkles with a compound containing: Hyaluronic Acid, Sea Kelp Bioferment, Horse Chestnut Extract, Squalane, DIM, and Tetrahydropiperine within the ranges set forth above, and possibly with a total combined amount of 9.35% by weight with the remaining components being about 90.65% by weight of water and other inactive ingredients acting as a suspension mixture.

In other embodiments, the composition in its effective amount as a composition can be included in and/or take the form of any one of the group consisting of creams, lotions, milks or creams, ointments, gels, masks, mousses, scrubs, emulsions (water-in-oil and/or oil-in-water), dispersions, solutions, suspensions, cleansers, foundations, anhydrous preparations (sticks in particular lip balm, body and bath oils), shower and bath gels, porous solids, shampoo and hair care lotions, milks or creams for skin care or hair, cleansing lotions or milks, sunscreen lotions, milks or creams, artificial tanning lotions, milks or creams, pre shave, shaving or aftershave creams, foams, gels or lotions, makeup, lipstick, foam in the form of aerosol compositions also comprising a pressurized propellant, mascara or nail polish, skin essences, serums, adhesive or absorbent materials, transdermal patches, or emollient powders, lotions, milks or creams, sprays, body and bath oils, foundation basis, ointment, emulsion, colloid, compact suspension or solid, deodorant, anti-perspirant, pencil, sprayable formulation, brushable, blush, red, eyeliner, lipliner, lip gloss, face or body powder, styling gels or mousses, nail conditioning, lip balms, skin conditioners, moisturizers, lacquers, soaps, exfoliants, etc. These compositions may also be in the form of lipsticks intended either to color the lips or to prevent them from chapping, or makeup for eyes, eyes-shadows and foundations for the face. The compositions for the invention can include cosmetics, personal care products and pharmaceutical preparations.

In one embodiment the combined effective amount of indole-3-carbinol/3,3'-diindolylmethane (DIM) as suspended in the application medium is stored in sealed but not air-tight glass, plastic, porcelain, aluminum, and/or acrylic containers. Stabilizers and emulsifiers included in formulation above (e.g. cetyl alcohol, sodium polyacrylate, polsorbate 80, glyceryl stearate, dimethicone/divinyldimethicone/silsesquioxane crosspolymer mixture and phenoxyethanol as a preservative) may be further included.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A method of diminishing wrinkles, fine lines, blemishes, skin discoloration, cellulite, and/or bruising in human skin comprising:
    administering a topical treatment on a patient's skin, said topical treatment including:
    Hyaluronic Acid;
    a suspension mixture;
    Tetrahydropiperine,
    Horse Chestnut Extract,
    Lecithin; and
    an effective dose of between 0.001% and 10% of a compound indole-3-carbinol or its derivatives, said topical treatment being applied to said patient's skin in need of diminishment in wrinkles, fine lines, blemishes, skin discoloration, cellulite, and/or bruising.

2. The method as claimed in claim 1, wherein said indole-3-carbinol is selected from the group consisting of 3,3'-diindolylmethane (DIM), 5,11-dihydroindolo-[3,2-b] carbazole (ICZ), and 5,6,11,12,17,18-hexahydrocyclonona [1,2-b: 4,5-b': 7,8-b"]triindole.

3. The method as claimed in claim 2, wherein said indole-3-carbinol is 3,3'-diindolylmethane (DIM).

4. The method as claimed in claim 1, wherein said indole-3-carbinol is derived from an enzymatic hydrolysis of glucosinolates in plants belonging to the *Brassica* genus.

5. The method as claimed in claim 1, wherein said suspension mixture of said topical treatment is a medium that is any one of oil based, water based, or alcohol based.

6. The method as claimed in claim 1, wherein said method further includes the application of an additional component selected from the group consisting of water, Vitamin E, Vitamin D, Vitamin K, Vitamin B1, Vitamin B2, Vitamin B3, Vitamin B4, Vitamin B5, Vitamin B6, Vitamin B9, Vitamin B12, Vitamin H, calcium, potassium, phosphorus, magnesium, iron, copper, zinc, algae, collagen, beta-carotene, alanine, arginine, asparagine, aspartic acid, cysteine, glutamine, glutamic acid, glycine, histidine, isoleucine, leucine, lysine, methionine, phenylalanine, piperine, proline, serine, threonine, tryptophan, tyrosine, valine, selenocysteine, pyrrolysine, glutathione, gamma-aminobutyric acid, kaolin, caprylic/capric triglyceride, petrolatum, sunflower wax, sodium polyacrylate, glycerin, isohexadecane, cholesterol, hazelnut oil, coconut oil, shea butter, almond butter, almond oil, avocado butter, avocado oil, argan oil, acrylates C10-30 alkyl acrylate crosspolymer, sorbitan laurate, polyglyceryl-4 laurate, dilauryl citrate, cetyl alcohol, sodium polyacrylate, polsorbate 80, glyceryl stearate, dimethicone/divinyldimethicone/silsesquioxane crosspolymer, stearic acid, ceteareth-20, and cetearyl alcohol.

7. The method as claimed in claim 1, wherein said method further includes incorporating the effective amount of said indole-3-carbinol into a medium so as to generate a product selected from the group consisting of ointments, gels, masks, mousses, scrubs, water-in-oil emulsions, (oil-in-water emulsions, dispersions, solutions, suspensions, cleansers, foundations, anhydrous preparations sticks, lip balm, body and bath oils, shower and bath gels, porous solids, shampoo and hair care lotions, milks or creams for skin care or hair, lotions or milks for cleansing, sunscreen lotions, artificial tanning lotions, pre shave, shaving or aftershave creams, foams, makeup, lipstick, foam in the form of aerosol compositions also comprising a pressurized propellant, mascara or nail polish, skin essences, serums, adhesive or absorbent materials, transdermal patches, or emollient powders, sprays, body and bath oils, foundation basis, ointment, colloid, compact suspension or solid, deodorant, anti-perspirant, pencil, sprayable formulation, brushable, blush, eyeliner, lipliner, lip gloss, face or body powder, styling gels or mousses, nail conditioning, lip balms, skin conditioners, moisturizers, lacquers, soaps, and exfoliants.

8. The method as claimed in claim 1, wherein said effective dose of a compound indole-3-carbinol is between 0.05% and 1% of said topical treatment.

9. The method as claimed in claim 1, wherein said Hyaluronic Acid is included at up to 10% by weight.

10. The method as claimed in claim 9, wherein said Hyaluronic Acid is included at 0.35%-2% by weight.

11. The method as claimed in claim 1, wherein said Tetrahydropiperine is included at 0.001% to 2.5% by weight.

12. The method as claimed in claim 11, wherein said Tetrahydropiperine is included at 0.08% to 1.5% by weight.

13. The method as claimed in claim 1, wherein said Horse Chestnut Extract is included at up to 90% by weight in the form of a Horse Chestnut Extract emulsion.

14. The method as claimed in claim 13, wherein said Horse Chestnut Extract is included at 1.5% to 7.5 by weight in the form of a Horse Chestnut Extract emulsion.

15. The method as claimed in claim 1, wherein said Lecithin is included at up to 25% by weight.

16. The method as claimed in claim 15, wherein said Lecithin is included at 0.1% to 10% by weight.

17. The method as claimed in claim 1, wherein said administered topical treatment further comprises Sea Kelp Bioferment or Extract included at up to 90% by weight in the form of a Sea Kelp Bioferment emulsion.

18. The method as claimed in claim 17, wherein said administered topical treatment further comprises Sea Kelp Bioferment or Extract included at 3% to 3.5% by weight in the form of a Sea Kelp Bioferment emulsion.

19. The method as claimed in claim 1, wherein said administered topical treatment further comprises Vitamin C included at up to 10% by weight.

20. The method as claimed in claim 19, wherein said administered topical treatment further comprises Vitamin C included at 0.25% to 0.75% by weight.

21. The method as claimed in claim 1, wherein said administered topical treatment further comprises Squalane included at 1.6% to 3% by weight.

* * * * *